United States Patent
Herbeck et al.

(10) Patent No.: US 8,200,702 B2
(45) Date of Patent: Jun. 12, 2012

(54) INDEPENDENTLY VARIABLY SCOPED CONTENT RULE APPLICATION IN A CONTENT MANAGEMENT SYSTEM

(75) Inventors: David G. Herbeck, Rochester, MN (US); John E. Petri, Rochester, MN (US); John P. Ponthempilly, Cheshire, CT (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 12/570,210

(22) Filed: Sep. 30, 2009

(65) Prior Publication Data

US 2011/0078114 A1 Mar. 31, 2011

(51) Int. Cl.
*G06F 17/30* (2006.01)
(52) U.S. Cl. ......... 707/791; 707/802; 707/822; 707/808
(58) Field of Classification Search ........... 707/600–831
See application file for complete search history.

(56) References Cited

U.S. PATENT DOCUMENTS

| | | | |
|---|---|---|---|
| 7,373,595 B2 * | 5/2008 | Jones et al. | 715/237 |
| 2008/0040397 A1 | 2/2008 | Herbeck et al. | |
| 2008/0077631 A1 | 3/2008 | Petri | |
| 2008/0189595 A1 | 8/2008 | Petri | |
| 2008/0201349 A1 | 8/2008 | Petri | |
| 2008/0222183 A1 | 9/2008 | Petri | |
| 2008/0243897 A1 | 10/2008 | Petri | |
| 2008/0244382 A1 | 10/2008 | Petri | |
| 2008/0250034 A1 | 10/2008 | Petri | |
| 2009/0024640 A1 | 1/2009 | Petri | |

OTHER PUBLICATIONS

Wikipedia, "Office Open XML," http://wikipedia.org/wiki/Office_Open_XML, printed Jan. 23, 2009.
Frank Rice, Microsoft Corporation, "Introducing the Office (2007) Open XML File Formats," http://msdn.microsoft.com/en-us/library/aa338205(printer).aspx, printed Jan. 23, 2009.
"SharePoint Use Cases," http://www.sharepointusecases.com/index.php/2008/08/offce-2003-and-sharepoint-2007-c..., printed Jan. 23, 2009.
Johnson&Johnson, "System Design Specification, Metadata Synchronization, Release 1.0 (draft), Doument Version 1.0".
Peter Koen, Microsoft, "Tools and Object Models for Serverside-Side Office Document Development," Microsoft Office SharePoint Server 2007.

* cited by examiner

Primary Examiner — Isaac M Woo
(74) Attorney, Agent, or Firm — Roy W. Truelson (57) ABSTRACT

A content management system (CMS) synchronization mechanism synchronizes content attributes, preferably in metadata, with content documents. For each of one or more content attributes (e.g. metadata fields), a respective content document context is associated. Each attribute is synchronized to content in the content document according to the associated context. Preferably, the content document contains multiple nested files, and context limits synchronization to a subset of files. Synchronization rules, enforced by a synchronization engine, define respective attributes and content to be synchronized, each rule having an associated context in the content document. Rules are preferably created in XML format, and parsed to produce a document object model upon which the synchronization engine operates.

16 Claims, 8 Drawing Sheets

FolderA
    FolderA.SubfolderA
        FolderA.SubfolderA.XMLFileA
        FolderA.SubfolderA.XMLFileB
        FolderA.SubfolderA.XMLFileC
    FolderA.SubfolderB
        FolderA.SubfolderB.SubfolderC
            FolderA.SubfolderB.SubfolderC.XMLFileD
            FolderA.SubfolderB.SubfolderC.XMLFileE
            FolderA.SubfolderB.SubfolderC.XMLFileF
        FolderA.SubfolderB.XMLFileG
        FolderA.SubfolderB.XMLFileH         .
        .
        .

FolderB

.
        .
        .

FolderC
    FolderC.SubfolderD
        FolderC.SubfolderD.ImageFileA
        FolderC.SubfolderD.ImageFileB
        FolderC.SubfolderD.ImageFileC
        FolderC.SubfolderD.ImageFileD         .
        .
        .

INDEPENDENTLY VARIABLY SCOPED CONTENT RULE APPLICATION IN A CONTENT MANAGEMENT SYSTEM

FIELD OF THE INVENTION

The present invention relates to digital data processing, and in particular to the use of content management systems for processing heterogeneous data.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system has the capability to store mountains of data, and using readily available networks can access even more data. Unfortunately, the capability of digital systems to store and access data has generally outpaced the ability of users to organize or understand the data. Considerable effort has been and continues to be devoted to developing improved techniques for organizing, searching, collating and presenting meaningful information to users from the voluminous data potentially available.

One of these developments has been the content management system (CMS). A CMS is a computer program or set of programs for managing a repository of documents containing heterogeneous data, usually on behalf of multiple users. The data in the repository may include text files, spreadsheets, structured tables, graphics, still digital images, digital video, audio, and so forth. XML documents, which have the capability to incorporate heterogeneous content and metadata, are exemplary candidates for storage and management using a CMS system, although CMS systems are not necessarily limited to XML documents. The CMS allows users to add data to the repository, modify data, copy, delete and/or perform other operations with respect to the data. The CMS typically includes tools for indexing, searching and retrieval of data in the repository, as well as for organizing and formatting output of data from the repository.

A CMS typically includes rules which enforce data integrity. These rules are used to process files whenever a document (which may contain one or multiple files) is checked into or out of the repository. If a rule is satisfied, the CMS may perform subsequent processing of the content. Known content management systems may include rules related to bursting, linking and synchronization. Bursting rules govern how a document is bursted, or broken into individual chunks, when the document is checked into the repository. By bursting a document into chunks, the individual chunks may be reused in other documents and by other authors. Linking rules are used for importing and associating objects related to a CMS document based on particular elements or attributes from the document as specified by the rules. For example, an XML document that references external images can take advantage of linking rules so that relationships between the XML content and the external images are automatically created when the document is checked into the repository. Another kind of linking rule governs what content in a repository a user may link to in a document that will be subsequently checked into the repository. Synchronization rules govern synchronization between content and metadata related to the content. For example, a synchronization rule may specify that whenever a specified CMS attribute is changed, a particular piece of XML in the content should be automatically updated with that attribute's value.

Much of the data in a typical CMS is not directly searchable using conventional search and retrieval techniques. For example, it is difficult or impossible to search raw digital images. Typically, a CMS repository is organized as a collection of files and a structured relational database of metadata. The individual files contain the raw data provided by the users. The relational database contains metadata which characterizes the files. For example, the database may include a database table, in which each entry (row) in the table corresponds to a single one of the files in the repository, and the fields contain parameters describing the respective files. This metadata could include anything which might be useful in categorizing and retrieving files from the repository, such as a type of data in the file, file size, title, date of creation, date of most recent edit, version, author, subject, keywords, references to other files, etc. Content in the CMS is typically located by searching the metadata using any of various conventional search techniques. It may also be possible to search selective types of data in the raw data files; for example, it may be possible to search text files for selective strings of text characters.

Maintenance of the metadata in a CMS is a significant task. Metadata may be manually entered, but clearly it is desirable to reduce or avoid manual entry where practicable. Some CMS's have content parsers which parse documents as they are checked into or out of the repository and extract selective metadata for inclusion in the database. Parsers can in some cases extract metadata for inclusion in a content document, such as in selective tags of an XML file. Such parsers can significantly reduce the burden of maintaining the metadata and/or content documents, although they do not necessarily eliminate the need for manual entry entirely.

One deficiency of current parsers which extract metadata, not necessarily recognized, is that, for certain types of documents, the context of the tags or other data within a document can change within a single document being parsed. For example, MICROSOFT WORD™ supports documents which are zipped files containing potentially multiple XML documents, arranged in multiple folders having a pre-defined hierarchical structure. Each XML file has some pre-defined purpose. E.g., one might define page layout, another the fonts, another the headers/footers, etc. At least one will contain the body of the text. Some might be exclusively metadata, such as document creator, date and so forth. Because the document may contain multiple XML folders, each folder containing potentially multiple XML files, the same tag name can be used in different XML files to mean something slightly different, depending on the context. It would be desirable to provide greater automated parsing capability in these circumstances.

SUMMARY OF THE INVENTION

A synchronization mechanism for a content management system (CMS) extracts selective metadata from content documents in the CMS repository and/or corresponding metadata in a metadata database, and automatically synchronizes document content with corresponding metadata or content from documents accordingly, i.e. automatically updates either the metadata database or the corresponding content document. For each of one or more content attributes, (e.g. metadata fields), a respective content document context is associated.

The content attribute is synchronized by being extracted from or inserted into the content document in accordance with the associated context.

In the preferred embodiment, at least some of the content data is stored in a file nested form, in which some content files incorporate other content files. In particular, it is preferred that at least some of the content documents have a hierarchical organization referencing other content documents. An example of such a nested, hierarchical organization of content documents is the ".docx" document format employed by MICROSOFT WORD™ 2007 and later versions, it being understood that the present invention is not necessarily limited to content documents in the ".docx" format.

In the preferred embodiment, the synchronization mechanism includes a set of content synchronization rules which are enforced by a synchronization engine. The synchronization rules are generated as editable documents expressing the rules in a document markup language, which is preferably XML. The rules are then parsed by a suitable markup language parser (e.g. XML parser) to produce synchronization rules in a standardized, document object model form. The synchronization engine parses the content document, applying the standardized synchronization rules to determine appropriate synchronization actions. A respective context is independently associated with each of one or more synchronization rules to be applied. The context indicates the file or subset of files referenced by the base content document in which the synchronization data is to be found and the synchronization rule applied. The context may be optional (according to a flag value), indicating that it is merely a preference, or mandatory, indicating that the data must come from a file source within the context. In the case of a mandatory context, the applicable rule will be enforced only for the corresponding file or files. In the case of an optional context, the synchronization data will preferentially be found in the corresponding file or files, but if the data is not found therein, it may be found in any file.

The exemplary application is a content management system for documents used for regulatory compliance in the pharmaceutical industry. In this industry, there is a need to track many versions of complex documents, so that the complete document history is available. Documents often overlap and have many component parts, so that correct context of data within component parts of a document is critical.

By providing easy to use synchronization rules expressible in XML form and having identifiable context, extraction of data by means of automated parsing in a complex CMS is enhanced, thereby reducing the burden of manual entry of metadata and sources of error.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
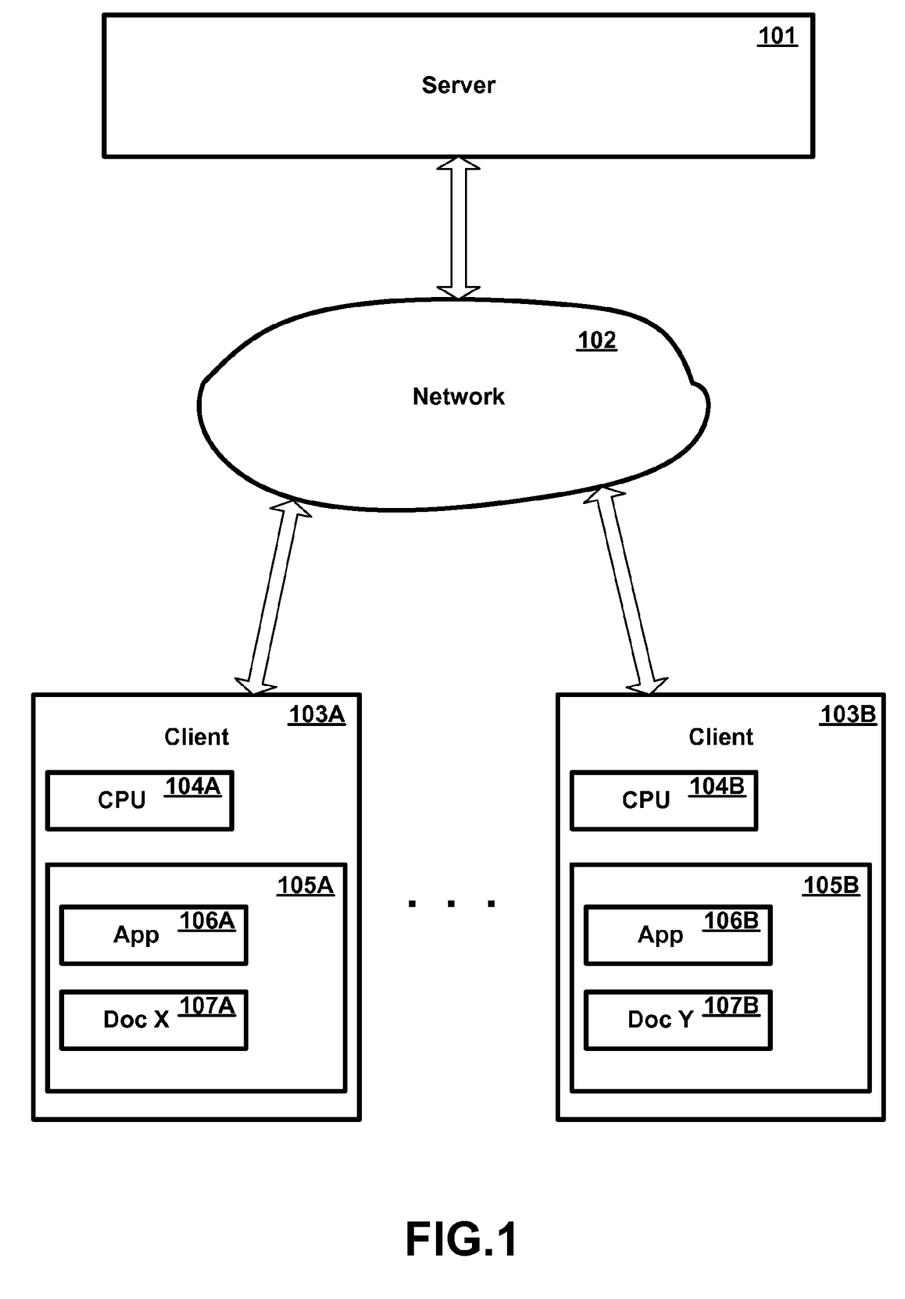
FIG. 1 is a high-level conceptual illustration of a networked computer system environment for managing content documents in a content management system, according to the preferred embodiment of the present invention.

Referring to the Drawing, wherein like numbers denote like parts throughout the several views, FIG. 1 is a high-level conceptual representation of a networked computer system environment 100 for managing content document in a content management system, according to the preferred embodiment of the present invention. The environment includes a server computer system 101 coupled to a network 102 for communication with multiple client computer systems 103A, 103B (herein generically referred to as feature 103), of which two are shown for illustrative purposes in FIG. 1, it being understood that the actual number may vary. Server system 101 contains the content management system (CMS), as described in greater detail herein. Network 102 may be any of various local or wide area networks known in the art, and in particular may be the Internet. Additionally, multiple networks could be used to communicate with clients.

Each client 103 contains one or more central processor units (CPUs) 104A, 104B (herein generically referred to as feature 104) and a respective client memory 105A, 105B (herein generically referred to as feature 105) for storing programs containing instructions executable on the client's processor 104, as well as other data. In particular, in accordance with the preferred embodiment each client contains at least one content-generating application 106A, 106B (herein generically referred to as feature 106) which generates content for management by a content management system. Content generating applications 106 may be the same in all clients or may be different, and each client may have one or more than one such application. A content generating application 106 is any application in the client 103 which generates content (either by creating original content or editing pre-existing content) which is managed by the content management system. Examples of such applications include web browsers, word processors, spreadsheet applications, graphics editors, image capturing and editing applications, etc. Content generation applications generally create and/or edit local copies of content document files, illustrated in FIG. 1 as content document files 107A, 107B (herein generically referred to as feature 107), the local copies being uploaded to or downloaded from server 101.

Figure 2:
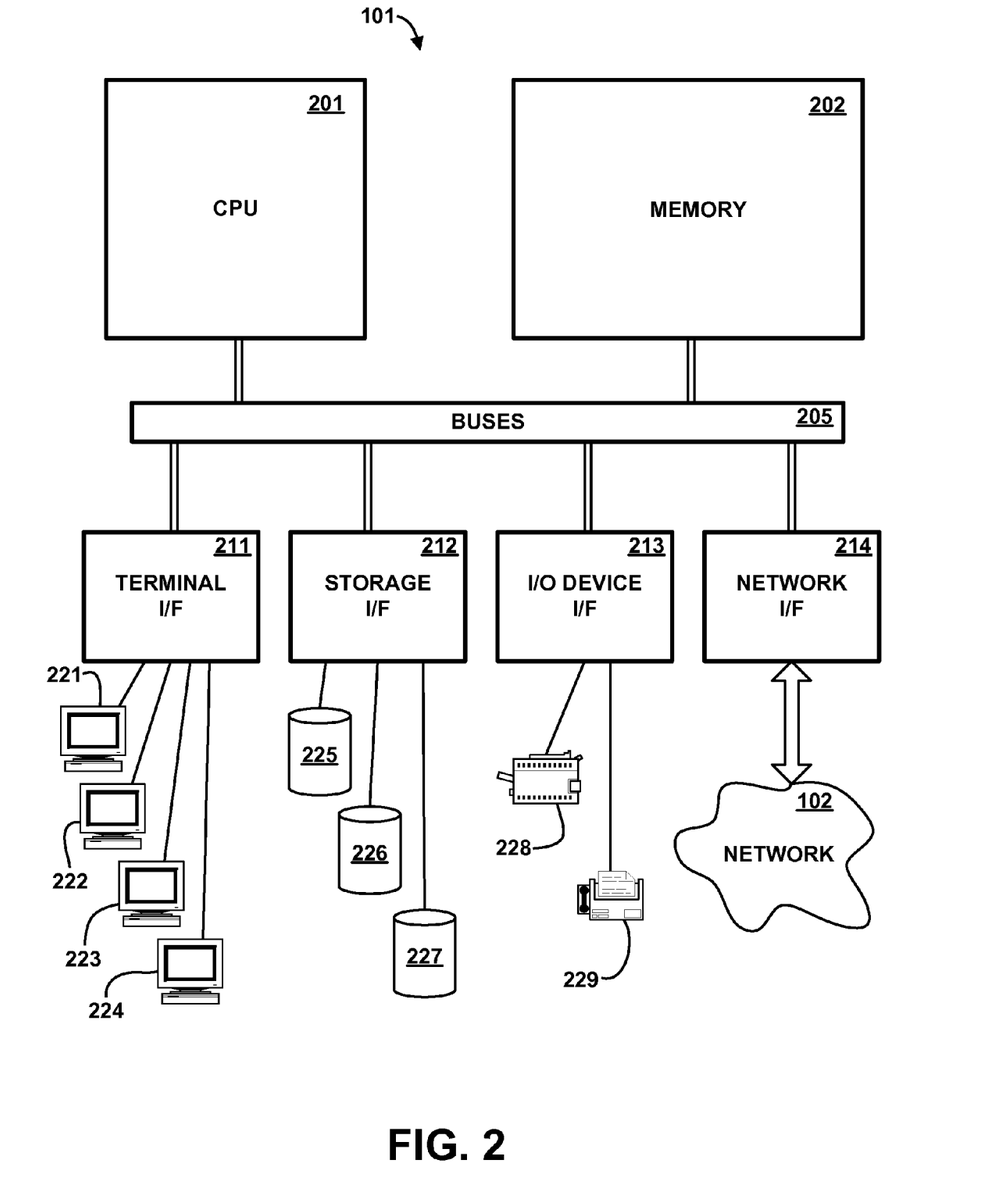
FIG. 2 is a high-level block diagram of the major hardware components of a server computer system for supporting a content management system, according to the preferred embodiment.

FIG. 2 is a high-level representation of the major hardware components of a server computer system 101 for use supporting a content management system, according to the preferred embodiment of the present invention. Server system 101 includes at least one general-purpose programmable processor (CPU) 201 which executes instructions and processes data from main memory 202. Main memory 202 is preferably a random access memory using any of various memory technologies, in which data is loaded from storage or otherwise for processing by CPU 201.

One or more communications buses 205 provide a data communication path for transferring data among server CPU 201, main memory 202 and various I/O interface units 211-214, which may also be known as I/O processors (IOPs) or I/O adapters (IOAs). The I/O interface units support communication with a variety of storage and I/O devices. For example, terminal interface unit 211 supports the attachment of one or more user terminals 221-224. Storage interface unit 212 supports the attachment of one or more direct access storage devices (DASD) 225-227 (which are typically rotating magnetic disk drive storage devices, although they could alternatively be other devices, including arrays of disk drives configured to appear as a single large storage device to a host). I/O device interface unit 213 supports the attachment of any of various other types of I/O devices, such as printer 228 and fax machine 229, it being understood that other or additional types of I/O devices could be used. Network interface 214 supports a connection to external network 102 for communication with one or more other digital devices, and specifically for communication with clients 103. Network interface 214 might support connection to multiple networks.

It should be understood that FIG. 2 is intended to depict the representative major components of server system 101 at a high level, that individual components may have greater complexity than represented in FIG. 2, that components other than or in addition to those shown in FIG. 2 may be present, and that the number, type and configuration of such components may vary, and that a large server computer system will typically have more components than represented in FIG. 2. Several particular examples of such additional complexity or additional variations are disclosed herein, it being understood that these are by way of example only and are not necessarily the only such variations.

Although only a single CPU 101 is shown for illustrative purposes in FIG. 2, server system 101 may contain multiple CPUs, as is known in the art. Although main memory 202 is shown in FIG. 2 as a single monolithic entity, memory 202 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although communications buses 205 are shown in FIG. 2 as a single entity, in fact communications among various system components is typically accomplished through a complex hierarchy of buses, interfaces, and so forth, in which higher-speed paths are used for communications between CPU 201 and memory 202, and lower speed paths are used for communications with I/O interface units 211-214. Buses 205 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate buses 205 from various communications paths running to the various I/O devices, it would alternatively be possible to connect some or all of the I/O devices directly to one or more system buses.

Computer system 101 depicted in FIG. 2 has multiple attached terminals 221-224, such as might be typical of a multi-user "mainframe" computer system. Typically, in such a case the actual number of attached devices is greater than those shown in FIG. 2, although the present invention is not limited to systems of any particular size. User workstations or terminals which access computer system 101 might be used to provide a user interface to users executing applications similar to client content generating applications 106, but which execute directly on server computer system 101, without the need to communicate through a network. Server system 101 may alternatively be a single-user system, typically containing only a single user display and keyboard input. Furthermore, while the invention herein is described for illustrative purposes as embodied in a single computer system, the present invention could alternatively be implemented using a distributed network of computer systems in communication with one another, in which different functions or steps described herein are performed on different computer systems.

While various system components have been described and shown at a high level, it should be understood that a typical computer system contains many other components not shown, which are not essential to an understanding of the present invention. In the preferred embodiment, server computer system 101 is a multi-user computer system, such as a computer system based on the IBM i/Series™ architecture, it being understood that the present invention could be implemented on other computer systems.

Figure 3:
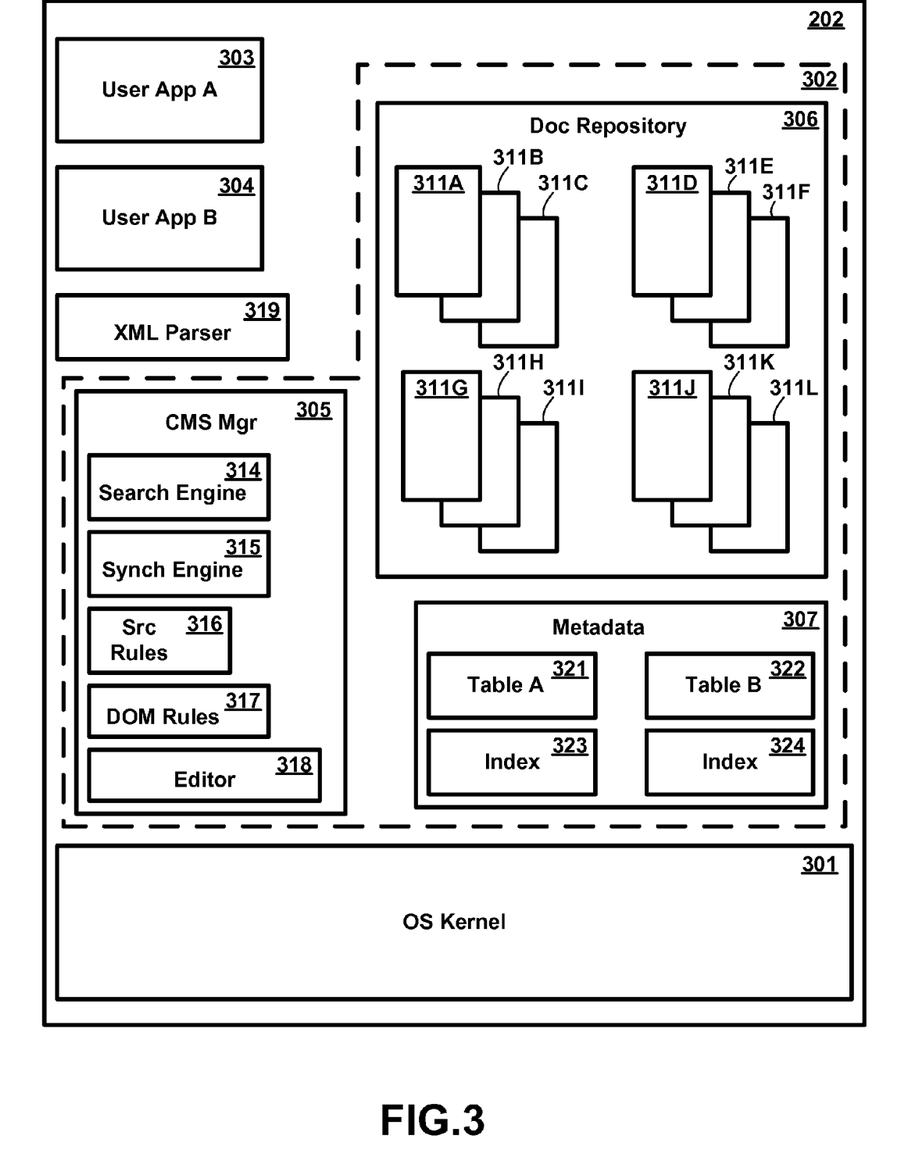
FIG. 3 is a conceptual illustration of the major software components of the server computer system of FIG. 1, according to the preferred embodiment.

FIG. 3 is a conceptual illustration of the major software components of server system 101 in memory 202. Operating system kernel 301 is executable code and state data providing various low-level software functions, such as device interfaces, management of memory pages, management and dispatching of multiple tasks, etc. as is well-known in the art. A content management system (CMS) 302 contains and manages heterogeneous document data which is maintained by server system 101 and for which the server provides access to one or more users, who may be directly attached to server system 101 or may be remote clients who access server system 101 through network 102 using a client/server access protocol. Server 101 may further include one or more user applications 303, 304, of which two are shown for illustrative purposes in FIG. 3, in being understood that the number may vary, and that server 101 need not necessarily include any user applications. User applications 303, 304 may include server-based content generating applications similar to client content generating applications 106, e.g., editors, word processors and other applications used to generate content for CMS 302, or may be unrelated applications.

CMS 302 comprises a CMS management application (CMS manager) 305, a document repository 306, and metadata 307. Document repository 306 is a collection of documents (files) 311A-311L (herein generically referred to as feature 311) managed by the CMS. These documents may contain data of different types and/or adhere to different file formats. Files 311 in the repository may include any or all of text files, spreadsheets, structured tables, graphics files, digital images, video, audio, and so forth, and within any such category of files, there may be files of different format. Files in the repository may reference or incorporate other files. Although repository 306 is represented in FIG. 3 as containing twelve files 311A-311L, it will be understood that the number of files may vary and is typically much larger, and furthermore that a repository may have a complex directory structure or organization, containing files in different folders or directories of files, which may by hierarchical.

Metadata 307 contains data characterizing or describing the documents in repository 306, and is in particular useful for tracking document histories, recording associations, locating content, and so forth. Metadata 307 is essentially a structured relational database for information relative to the content of repository 306. Metadata contains one or more tables 321-322 (of which two are shown in FIG. 3), each having a plurality of entries or records (conceptually rows of the table), each entry containing at least one (and usually many) fields (conceptually columns of the table), as is known in the database art. Database tables 321-322 might contain almost any type of data which is useful for managing repository 306, but in particular at least one of tables 321 will typically contain a plurality of entries, each entry corresponding to a respective file in repository 306 and containing information specific to the corresponding file. Associated with the database tables are one or more auxiliary data structures, such as indexes 323-324. Auxiliary data structures characterize the structure of the database tables 321-322 and data therein, and are useful in various tasks involved in database management, particularly in executing queries against the data in tables 321-322. Auxiliary data structures could include, in addition to database indexes 323-324, materialized query tables, histograms, or other auxiliary structures as are known in the art. Auxiliary database structures are typically maintained automatically by the CMS as the underlying data in tables 321-322 changes. Although metadata 307 is represented in FIG. 3 having two tables and two indexes, it will be understood that the actual number of such entities may vary, that not all such entities need be present, and that other or additional entities may be present.

CMS management application 305 is a set of computer programs or functions (i.e., executable computer programming code which execute on CPU 201) providing basic functions for the management of documents in repository 306 and the maintenance of metadata 307. CMS manager 305 preferably allows users to perform basic document access operations, such as checking a document into the repository, checking a document out of the repository, searching the repository to find content, deleting files from the repository, and so forth. CMS manager preferably includes a search engine 314, synchronization engine 315, synchronization rules source file 316, document object model synchronization rules 317, and metadata editor 318. CMS manager may include other and additional functions (not shown) necessary or desirable for managing document repository 306 and metadata 307.

Search engine 314 is used for searching the metadata 307 and/or document repository 306 to identify documents of interest or data relative to documents. Search engine may use any of various techniques known in the database art for searching, and in particular may use indexes 323-324 or other auxiliary database structures in metadata 307. Searching can be accomplished using a structured query language (SQL) query protocol, or any other suitable search protocol. CMS manager may further include more sophisticated searching functions, such as a query optimizer for optimizing query execution strategies, and the ability to save and re-use optimized query execution strategies.

Synchronization engine 315 is used to synchronize content documents with metadata 307 or with other documents in repository 306. Synchronization engine 315 parses documents being checked into and/or out of repository 306 in conformance with applicable synchronization rules, and particular in conformance with rules expressed in document object model 317, as explained in greater detail herein. In the preferred embodiment, source synchronization rules file 316 contains editable synchronization rules expressed in XML format. The source synchronization rules file 316 is parsed by XML parser 319 to produce document object model 317 upon which synchronization engine 315 operates, i.e. to produce synchronization rules in a standardized object model format. Preferably, there is a separate source synchronization rules file 316 and corresponding document object model 317 for each type of file to be automatically synchronized by synchronization engine 315, e.g. ".docx" files will have one set of synchronization rules, while ".doc" files may have another set, although only one set is shown in the illustrative embodiment of FIG. 3. Use of XML for the source rules file simplifies the process of maintaining synchronization rules; however, it will be understood that synchronization rules could alternatively be expressed in some other format. XML parser 319 is preferably a standard XML parser, and is typically an application separate from CMS manager 305, although it could alternatively be integrated into the CMS manager.

Metadata editor 318 is used for directly editing metadata. Metadata editor 318 can be used for entering data in those data fields or for those documents in which synchronization engine 315 is unable to extract correct or complete data from the document, or in other instances in which manual editing of metadata is necessary or desirable. CMS manager may optionally support editing of document content in whole or in part, although typically documents will be generated and edited by separate applications, and CMS manager merely manages the document repository.

Although a CMS 302 having a single document repository 306, two metadata tables 321-322, and two metadata indexes 323-324 are shown in FIG. 3, the number of such entities may vary, and could be much larger. The CMS may handle multiple document repositories, each having associated metadata, which may or may not be shared. Some entities represented in FIG. 3 might not be present in all implementations. CMS manager 305 may have other or additional functions (not shown), and some functions (e.g. metadata editor) may be contained in separate applications or may not be present. Although CMS manager 305 is represented in FIG. 3 as part of CMS 302, the CMS manager, being executable code and associated control structures, is sometimes considered an entity separate from the CMS, i.e., the data being managed.

Various software entities are represented in FIG. 3 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 3, it will be understood that the actual number of such entities may vary, and in particular, that in a complex server environment, the number and complexity of such entities is typically much larger. Additionally, although software components 302-307, 311, 314-319 and 321-324 are depicted in FIG. 3 on a single server system 101 for completeness of the representation, it is not necessarily true that all programs, functions and data will be present on a single computer system or will be performed on a single computer system. In particular, creation and editing of documents in the document repository is typically performed by individual users on remote or distributed systems, the documents being transmitted via one or more networks to and from server 101. It is further possible that repository 306 itself is stored in a distributed fashion on multiple computer systems.

While the software components of FIG. 3 are shown conceptually as residing in memory 202, it will be understood that in general the memory of a computer system will be too small to hold all programs and data simultaneously, and that information is typically stored in data storage devices 225-227, comprising one or more mass storage devices such as rotating magnetic disk drives, and that the information is paged into memory by the operating system as required. In particular, document repository 306 is typically much too large to be loaded into memory, and typically only a small portion of the total number of documents is loaded into memory at any one time. The full document repository 306 and associated metadata 307 is typically recorded in disk storage 225-227. Furthermore, it will be understood that the conceptual representation of FIG. 3 is not meant to imply any particular memory organizational model, and that server system 101 might employ a single address space virtual memory, or might employ multiple virtual address spaces which overlap.

The CMS is intended to manage documents of heterogeneous types without restricting users to some uniform file format, and accordingly documents 311 within document repository 306 may be of various types. But in particular, in accordance with the preferred embodiment at least some of the files managed by the CMS and within repository 306 are multi-part content documents having a hierarchical content structure, in which other files are or may be incorporated by reference.

Figure 4:
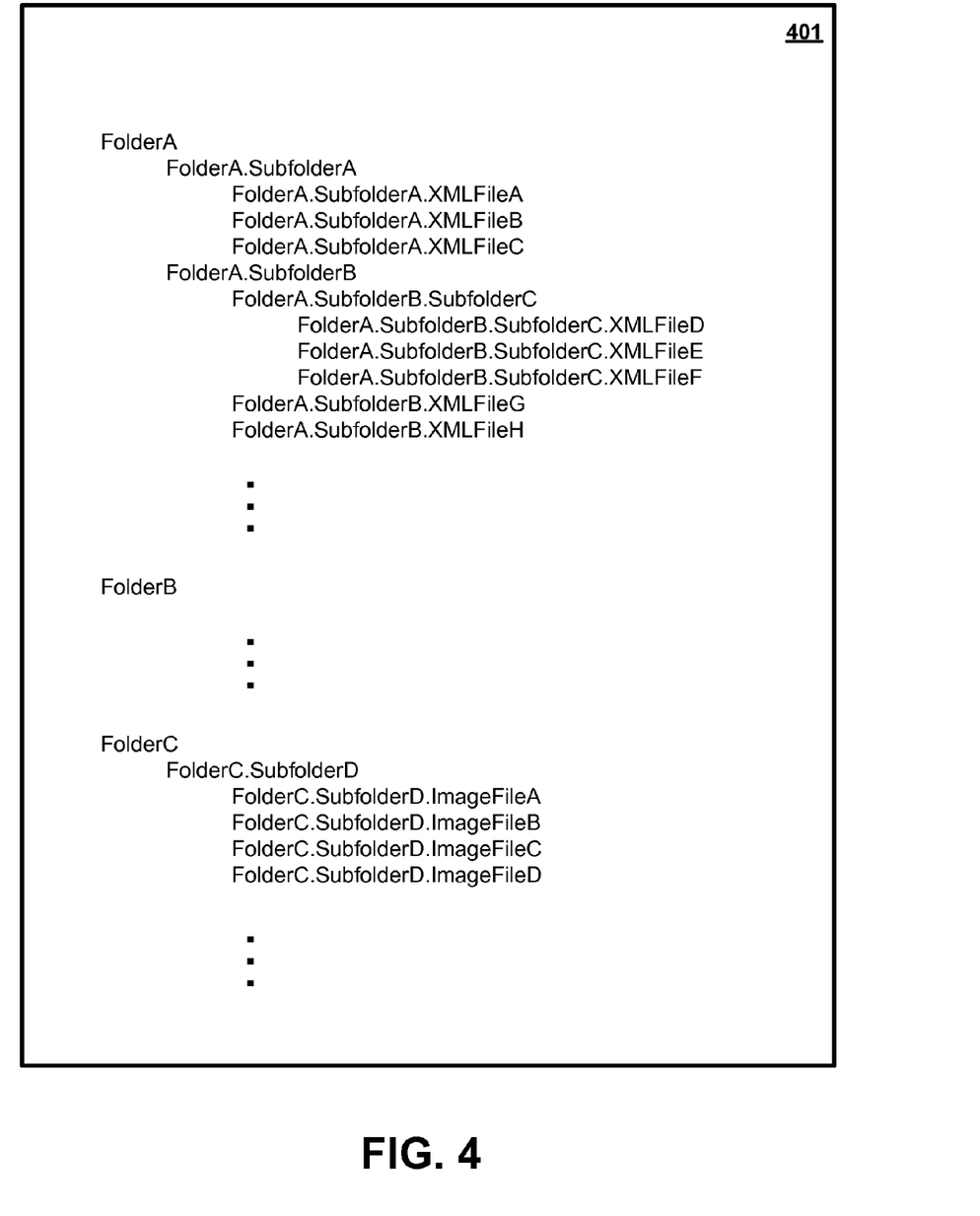
FIG. 4 is a conceptual illustration showing a structure of a multi-part content document file having a hierarchical content structure, according to the preferred embodiment.

FIG. 4 is a conceptual illustration showing a structure of a file representing a multi-part content document 401 having a hierarchical content structure, according to the preferred embodiment. As shown in FIG. 4, document file 401 contains multiple folders, of which three are represented in the exemplary file, being designated FolderA, FolderB, FolderC. Each such folder may contain one or more subfolders; for example, FolderA contains subfolders SubfolderA and SubfolderB. Each subfolder may additionally contain one or more subfolders; for example, SubfolderB contains the subfolder SubfolderC. This hierarchical relationship may continue to an indefinite number of level of subfolders. At some level, a subfolder will contain one or more files, although files are not always contained at the same level of the hierarchy. For example, SubfolderC in SubfolderB in FolderA contains the files XMLFileD, XMLFileE and XMLFileF. Files may be of different types and may contain various types of data. For example, files may be XML files or other tagged text, plain text, structured data tables, images, and so forth.

The multi-part document file 401 as shown in FIG. 4 is only a hierarchical structure referencing other files, which collectively contain the document content. However, file 401 could alternatively contain text, tags, and so forth embedded directly in the file, which could be in lieu of or in addition to references to other files. It should be understood that FIG. 4 is a conceptual illustration for purposes of understanding the nested hierarchical internal file structure of certain files according to the preferred embodiment, and that the actual structure may vary. In particular, while a certain number of folders and files are shown in the exemplary multi-part document file 401 of FIG. 4, it will be understood that the actual number of such files and folders may vary, and the hierarchical structure may be more or less complex than illustrated.

An example of such a multi-part content document file having a hierarchical content structure is a '.docx' file according to MICROSOFT WORD™ 2007 and later version file formats, it being understood that a multi-part content document file having a hierarchical content structure is not limited to the '.docx' format In accordance with the preferred embodiment, CMS 302 maintains heterogeneous content documents in its repository 306, including at least some documents having a nested, hierarchical organization as shown and described with reference to FIG. 4. Documents are created and edited by client applications, which may execute on separate client systems connected via a network to server 101, or alternatively, directly on the server system. Metadata is maintained in CMS 302 to support queries and/or other operations on content in the repository. When content documents are placed in the repository and/or removed from the repository, at least one content attribute, preferably from metadata, is automatically synchronized with the content documents by synchronization engine 315 enforcing synchronization rules. At least some of these synchronization rules are context sensitive, i.e., the applicable content document data which is synchronized with the metadata depends on the context of the data within the content document, and specifically depends on the file or files within a nested hierarchical content document structure in which the content data is found. This process is described in greater detail below with reference to the accompanying figures. In the exemplary embodiments described below, the content of a document is synchronized with content attributes in metadata; however, it will be appreciated that the synchronization engine and rules could alternatively operate to synchronize a document with content attributes in another document, whether metadata describing the documents exists or not. The present invention should not be construed as limited to synchronization involving metadata.

Figure 5:
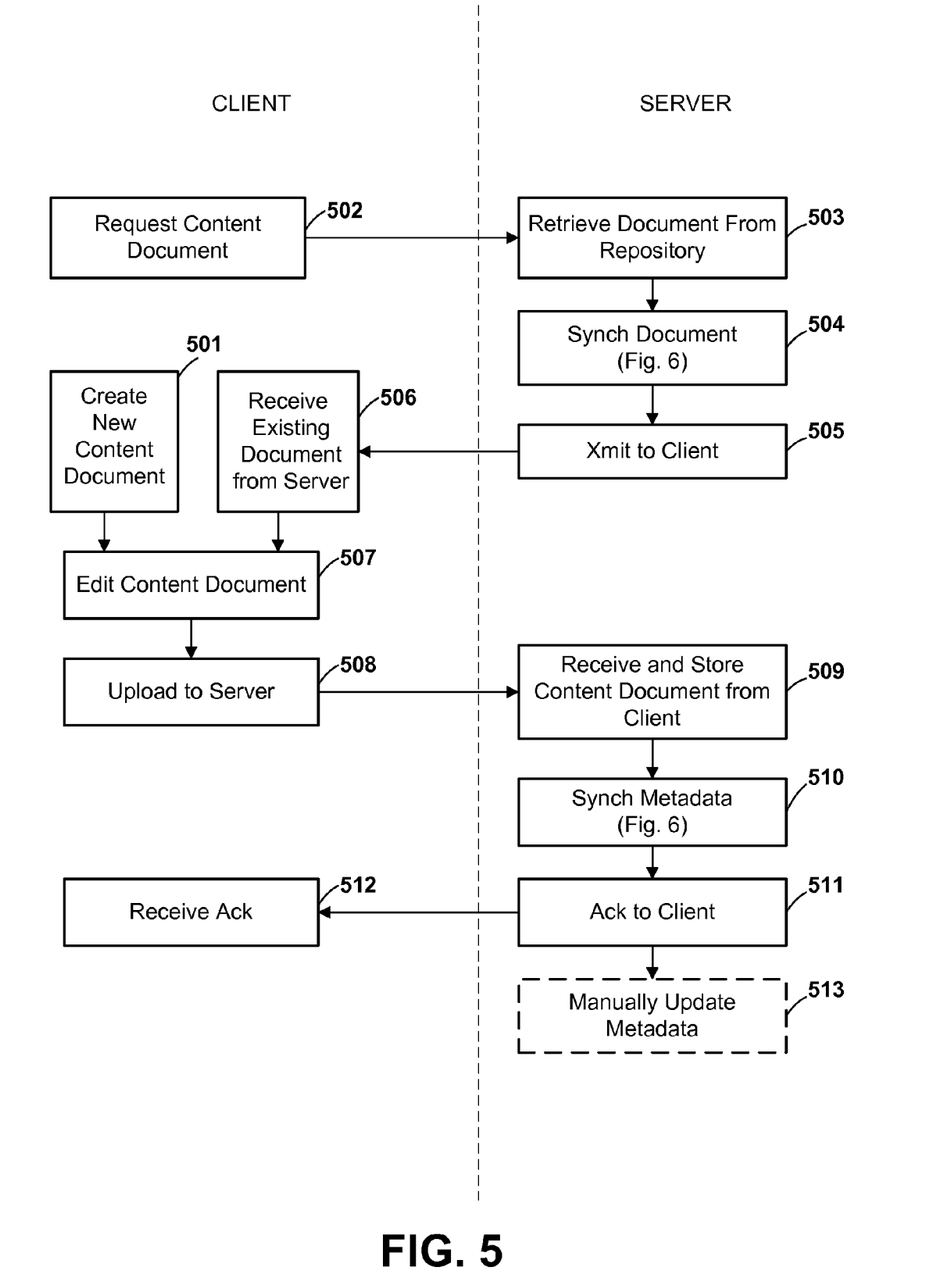
FIG. 5 is a flow diagram illustrating at a high level the client/server interaction involved in creating and editing content which is stored in a content management system, according to the preferred embodiment.

FIG. 5 is a flow diagram illustrating at a high level the client/server interaction involved in creating and editing content which is stored in a content management system, according to the preferred embodiment. Referring to FIG. 5, actions performed by a client application are shown in the left column, while actions performed by content management system on a server are shown in the right column. For clarity of description, it will be assumed herein that the client application executes on a client system 103 remotely connected to server 101 over network 102, although, as explained previously, a client application could execute directly on server system 101.

A client application initiates the process by either creating a new content document (step 501), or by submitting a request to the server to check out an existing content document from the document repository (step 502). In the latter case, the request is transmitted across the network and received by CMS 302, which retrieves the requested document from its repository 306 (step 503). CMS 302 then invokes synchronization engine 315 to synchronize the document being checked out with metadata 307. At this stage, synchronization means that, if necessary, the document being checked out may be selectively modified to conform to metadata characterizing the document and stored in tables 321, 322. The process of synchronization is represented in FIG. 5 as step 504, and is described in greater detail below with reference to FIG. 6. The synchronized document is then transmitted to the client across the network (step 505). The client receives the document from the server (step 506).

Whether a new content document was created from scratch (step 501) or an existing content document was obtained from the server (steps 502-506), the client then edits the content document (step 507). This can be performed by any of various client applications executing on the client. For example, text may be edited using a standard text editor or word processor; image data may be edited using any of various image capture or image editing applications, etc. Editing may amount to very simple operations which change only a few text characters, or may involve complex processes which incorporate or reference other content files of a heterogeneous nature.

When the client is finished editing the content document, the client uploads the document to the server for storage in the repository (step 508). The server receives and stores the content document from the client (step 509). Depending on the application, the server may replace (overwrite) an older version of an existing content document, or may maintain a separate record of each version of an existing content document.

The server then automatically synchronizes the metadata with the new or revised content document received from the client by invoking synchronization engine 315. At this stage, synchronization means that, if necessary, selective metadata fields in one or more tables 321, 322, are modified, and/or one or more record entries are added to one or more tables 321, 322, to conform to the new or revised content document received from the client. If necessary, one or more indexes 323, 324 and/or other auxiliary data structures (not shown) may also have to be modified to reflect correct data. This process of synchronization is represented in FIG. 5 as step 510, and is described in greater detail below with reference to FIG. 6. The server then sends an acknowledgment to the client (step 511), which receives it (step 512).

The changes to or addition of a content document may additionally require an appropriate person to manually enter some data in metadata tables 321, 322, represented in FIG. 5 as optional step 513. This manual entry is performed asynchronously with, and often well after, the document is entered in the repository.

Figure 6A:
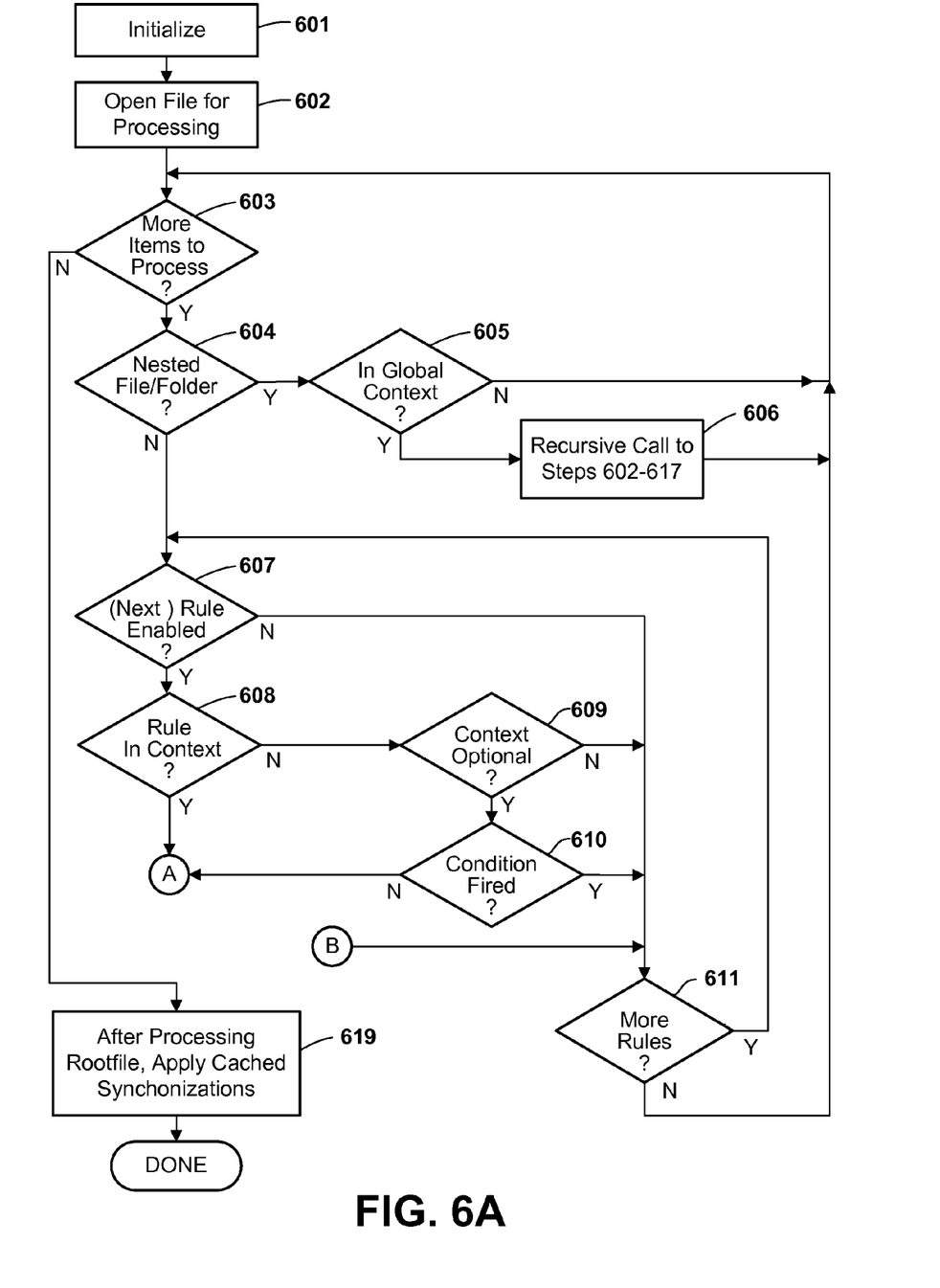
FIGS. 6A and 6B (herein collectively referred to as FIG. 6) are a flow diagram showing in greater detail the process of automatically synchronizing metadata to a content document in the document repository, according to the preferred embodiment.
Figure 6B:
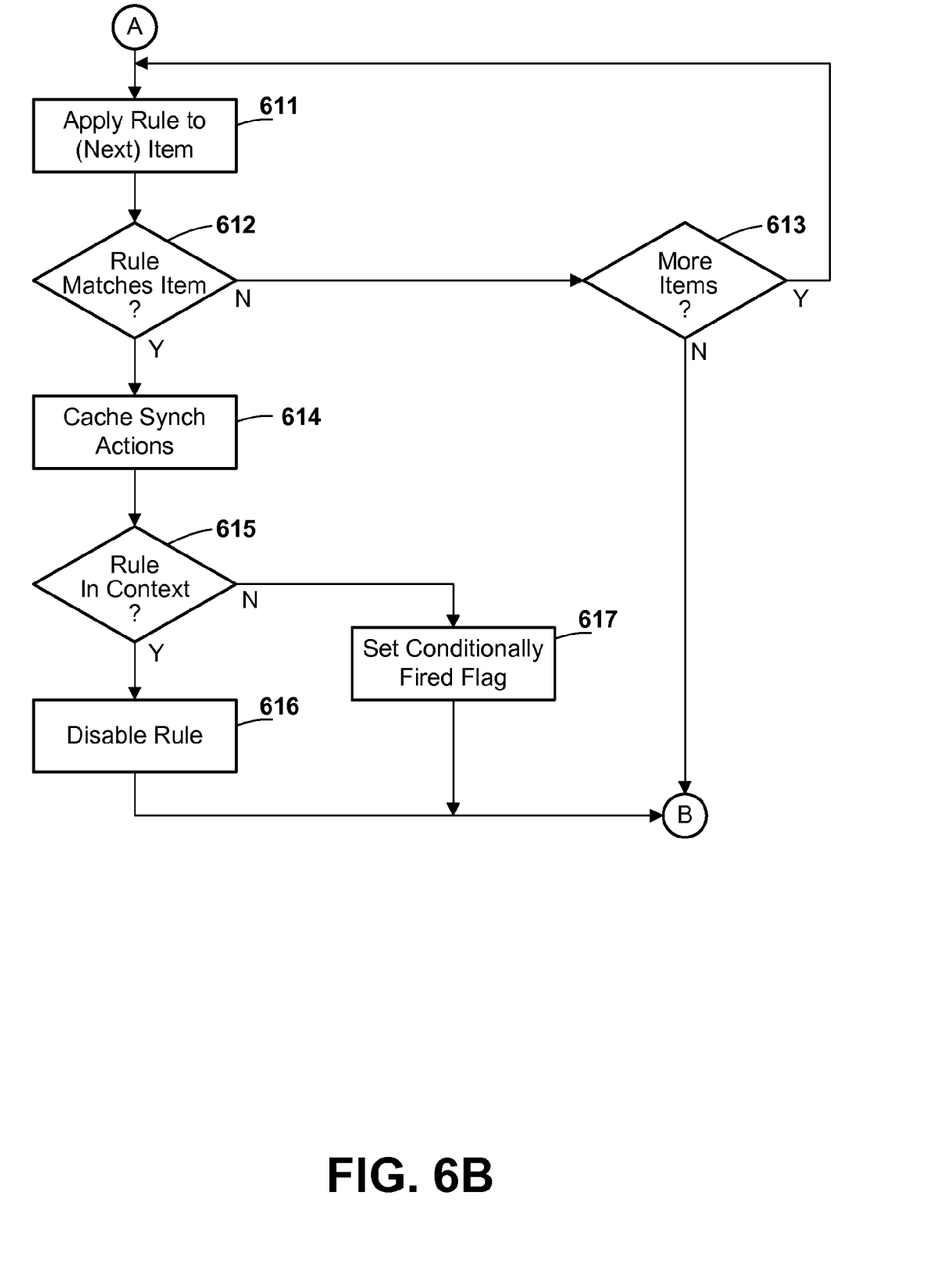

FIGS. 6A and 6B (herein collectively referred to as FIG. 6) are a flow diagram showing in greater detail the process of automatically synchronizing metadata 307 to a content document in the document repository, as performed by synchronization engine 315 according to the preferred embodiment. The process of FIG. 6 is preferably performed when the document is checked out of the repository and when it is stored in the repository, as explained above.

Referring to FIG. 6, the synchronization engine initializes itself (step 601). Among other things, a global array of rules flags is initialized at this stage. Each rule has an enable flag and a conditionally fired flag. The respective enable flag for each rule is initialized to an 'enabled' state if the rule is to be applied to the current document operation. Specifically, a synchronization rule may be specified as requiring synchronization only when checking out a document from the repository, or as requiring synchronization only when storing a document in the repository, or as requiring synchronization in both instances ('bidirectional synchronization"). The enable flag is set accordingly. The conditionally fired flag is initialized to a 'not fired' state; the function of this flag is explained below.

The file to be synchronized is opened for processing (step 602). A file to be synchronized may be a flat file containing only lines of text to parse, or might have a nested structure in which other files are referenced or contained (in which case the file to be synchronized is a root file), as previously explained. Some file structures may contain references to other files intermingled with lines of text.

The opened file is then sequentially parsed. If an item remains to be processed, the 'Y' branch is taken from step 603; when all items have been processed, the 'N' branch is taken and the processing of the current file is complete.

If the next item to be processed is a nested file (such as a reference to a single file, or a folder containing potentially many files and/or other folders), the 'Y' branch is taken from step 604. In this case, the nested file is compared against a global context limiter (step 605). The global context limiter is an optional parameter which specifies a global context for all synchronization actions, and is used to for purposes of execution efficiency if all rules are limited in their context to some subset of files. If the nested file is outside the scope of synchronization actions permitted by the global context limiter, then no further processing of the file need be performed, and the 'N' branch is take from step 605 to step 603. If the nested file is within the global context, the 'Y' branch is taken from step 605, and, a recursive call is made to process the nested file, applying steps 602-618 (step 606). Note that in this case, the global array of rule flags is not re-initialized. Upon return from the recursive call, the next item in the file is processed, beginning at step 603.

If the next item(s) to be processed is(are) not a nested file, the 'N' branch is taken from step 604. In this case, the items are presumably lines of text or similar items appropriate for direct parsing.

The synchronization engine attempts to apply each synchronization rule to the item(s) to be processed. At step 607, a (next) rule is selected and its enable flag examined. If the enable flag is not set to an 'enable' state, the 'N' branch is taken to step 611, and steps 608-610 and 612-618 are bypassed for the current synchronization rule (the rule is ignored).

If the rule is enabled (the 'Y' branch from step 607), then the context of the rule is examined (step 608). In the preferred embodiment, a rule may optionally specify a context to which it applies. The context of a rule is preferably specified in the rule itself, is associated with that rule alone, and is independent of the context associated with any other rule. The context determines a location of content data to be synchronized with the metadata. As explained previously, it is possible for different content data in multiple locations within a root file to meet the specifications of a synchronization rule. If the synchronization rule is applied to synchronize all such locations, unpredictable or erroneous data may be synchronized with the metadata. The rule specifies a context as a filepath parameter, i.e as a file or folder within the nested hierarchical file structure in which the content data is to be found. It would be possible to specify a context as multiple files or folders, or combinations of files and folders, using logical operators and/or wildcard symbols. If no context is specified for a rule, then effectively the context is the entire root file being processed, and all items being processed are considered "in context".

If the current items being processed are within the context of the rule, the 'Y' branch is taken from step 608 to step 612. If not, the 'N' branch is take from step 608. In the latter case, the synchronization engine determines whether the rule specifies that context is optional (step 609) and whether the conditionally fired flag for the rule has been set (step 610). A rule may specify that context is optional, which is a direction to synchronize with content data in the context if it exists, but to synchronize with content data outside the context if no matching content data exists in the rule's context. The conditionally fired flag is set if content data outside the context is found to match the rule; this flag prevents a second match to content data outside the context. If the context is optional ('Y branch from step 609), and the conditionally fired flag is not set ('N' branch from step 610), then the process continues at step 612. If either the context is not optional or the conditionally fired flag is set, the corresponding rule is ignored, and the process continues to step 611.

If either the 'Y' branch from step 608 or the 'N' branch from step 610 is taken, the rule is applied to the (next) item in the file being processed (step 612). I.e., the item, such as a line of text, is parsed to compare to any logical condition expressed in the synchronization rule to determine a match. If the item does not match the synchronization rule, the 'N' branch is taken from step 613. In this case, if there are more items to be examined, the 'Y' branch is taken from step 614, and the synchronization rule is applied to a next item at step 612. When all items have been examined, the 'N' branch is taken from step 614, to continue processing at step 611.

If the rule matches the item at step 613, the 'Y' branch is taken, and the corresponding synchronization action is cached (step 615). By "cached", it is meant that the synchronization action is tentatively recorded, but not applied to the data (either metadata 307 or the content document file). Caching the synchronization action may cause an earlier cached synchronization action to be superseded. E.g., if content data from an out-of-context file was earlier cached as an update to a metadata field, and the synchronization engine subsequently encountered content data from an in-context file for updating the same metadata field, the synchronization engine would discard the first update and cache only the later update from the in-context file.

If the synchronization rule is in its context, then the 'Y' branch is taken from step 616, and the enable flag for the corresponding rule is set to a 'disable' state (step 617). This will prevent the rule from being applied to subsequently processed content data items, effectively assuring that the synchronization update from the in context item is the one which will be ultimately applied. If the synchronization rule is not in its context, the 'N' branch is taken from step 616, and the conditionally fired flag corresponding to the rule is set (step 618). The conditionally fired flag prevents the rule from firing again for out-of-context data items, but does not prevent the rule from being applied to data within the rule's specified context. In either case, the process then continues to step 611.

At step 611, if more synchronization rules remain to be applied, the 'Y' branch is taken and steps 607-618 are repeated for the next synchronization rule. When all synchronization rules have been applied, the 'N' branch is taken from step 611, and the process returns to step 603 to determine whether there are more items to process.

When all items in the current file have been processed, the 'N' branch is taken from step 603. I.e., in the case of a recursive call to examine a file nested within another file, this amounts to a return from the call, and the synchronization engine continues processing the other file where it left off. When all items in the root file have been examined, the synchronization engine applies the cached synchronization actions to the data, either by updating metadata 307 to conform to content data in a document file being stored in the repository, or by updating a document file being checked out of the repository to conform to metadata (step 619).

Although a series of steps has been described above as a preferred embodiment, it will be appreciated that many variations of a process for synchronizing content data with metadata are possible, and in particular that some steps may be performed in a different order, that different data structures may be used, that an optional parameter for rules context may or may not be used, and/or that there may be multiple levels of context priority, so that the synchronization rule is applied to the highest priority context in which applicable content data is found.

Figure 7:
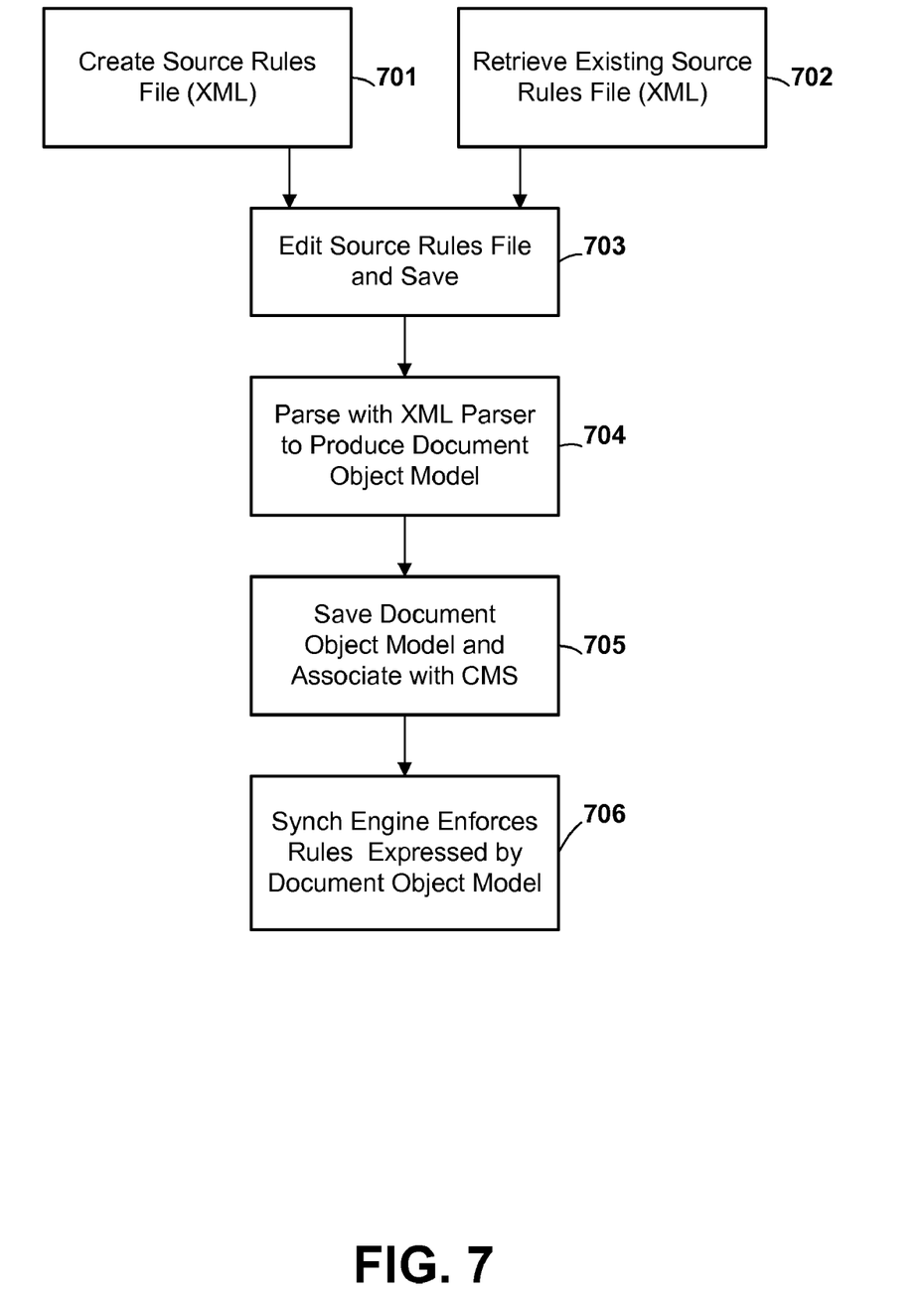
FIG. 7 is a flow diagram illustrating at a high level a process of forming synchronization rules for automatic synchronization of content document data with metadata, according to the preferred embodiment.

In the preferred embodiment, synchronization rules are created by generating a text file in an XML format specifying the rules, and parsing the file with an XML parser to produce a document object model, which is a template for synchronization engine 315. FIG. 7 is a flow diagram illustrating at a high level a process of forming synchronization rules for automatic synchronization of content document data with metadata 307, according to the preferred embodiment.

Referring to FIG. 7, either a new source rules file 316 is created (step 701), or a pre-existing source rules file 316 is retrieved from storage (step 702). The source rules file is a text file in XML format which specifies synchronization rules for synchronization of metadata 307 with documents in document repository 306. The source rules file is edited using any conventional technique for editing XML documents (step 703), e.g. a general purpose text editor or a special-purpose XML editor. The edited source rules file 316 is saved. An XML parser 319 is then used to parse the source rules file to produce a document object model version of the synchronization rules 317, and the resulting document object model saved (step 704). The source rules file of the preferred embodiment is parsed with a standard XML parser, which requires no modification. The resultant document object model 317 is saved in a manner associated with CMS Manager 305, so that it is later locatable and accessible by synchronization engine 315 (step 705).

The saved document object model 317 remains associated with CMS manager 305 for later use by synchronization engine. The synchronization engine later enforces synchronization rules expressed by the document object model when the synchronization engine is invoked (step 706), as described previously with respect to FIG. 6. The dashed line between steps 705 and 706 is used to indicate that there is a variable and potentially long time lag between these two events, and the synchronization engine could be (and usually is) invoked multiple times to enforce the synchronization rules.

Although it is preferred that synchronization rules be initially expressed in an XML format for ease of generation and maintenance, it would alternatively be possible to generate rules governing the operation of a synchronization engine by other means, or even to hard-code rules into a synchronization engine.

A partial exemplary synchronization rule file listing in source form is shown in Table 1 below

TABLE 1

```
<?xml version="1.0" encoding="UTF-8" ?>
- <!-- XML content rules file for DocX -->
    . . .
- <Variables>
    - <VariableDeclaration name="folderFilterValues">
            <Attribute attribute="customXml" />
            <Attribute attribute="docProps" />
      </VariableDeclaration>
    - <VariableDeclaration name="namespaceNameValues">
            <Attribute attribute="urn:qin:template:data" />
      </VariableDeclaration>
    - <VariableDeclaration name="fileNameValues">
            <Attribute attribute="core.xml" />
            <Attribute attribute="custom.xml" />
      </VariableDeclaration>
    - <VariableDeclaration name="urn:qin:template:data">
```

TABLE 1-continued

```
            <Attribute attribute="name" />
            <Attribute attribute="title" />
        </VariableDeclaration>
  - <VariableDeclaration name="core.xml" rule="coreRule">
            <Attribute attribute="title" />
            <Attribute attribute="authors" />
        </VariableDeclaration>
  - <VariableDeclaration name="metadata.xml" rule="metaRule">
            <Attribute attribute="title" />
        </VariableDeclaration>
        ...
</Variables>
- <SynchronizationRules>
        <Bidirectional attribute="authors" contentXPath="/cp:coreProperties/dc:creator/text( )" />
  - <ContentToAttribute attribute="title" name="coreRule">
        - <Variables>
                - <VariableDeclaration name="title">
                        <ContentXPath xPath="//title/text( )" />
                    </VariableDeclaration>
            </Variables>
        - <Content>
                <Variable name="title" />
            </Content>
    </ContentToAttribute>
  - <ContentToAttribute attribute="auxtitle" name="metaRule">
        - <Variables>
                - <VariableDeclaration name="title">
                        <ContentXPath xPath="//title/text( )" />
                    </VariableDeclaration>
            </Variables>
        - <Content>
                <Variable name="title" />
            </Content>
    </ContentToAttribute>
        ...
</SynchronizationRules>
</xc:XMLContentRules>
```

In the example above, the synchronization rules are for use in synchronization of a ".docx" file. The variable declaration for "folderFilterValues" defines a global context for the synchronization rules. I.e., as defined, the context of the synchronization rules is limited to the folders 'customXml' and 'docProps', and synchronization rules will be applied only to content within those folders.

Different types of synchronization rules are illustrated. A "bidirectional" rule, e.g.: "<Bidirectional attribute="authors" contentXPath="/cp:core . . . "/>" specifies a synchronization rule to be applied when placing content in the repository and when checking it out of the repository. In the example above, this bidirectional synchronization rule has no context (other than the global context defined in "folderFilterValues"), and will be applied to all files within the scope of the global context. I.e., all such files will be parsed until the specified content data is found.

A "content to attribute" rule, e.g. "<ContentToAttribute attribute="title"> . . . " specifies a synchronization rule to be applied when a content document is stored in the repository, but not when it is checked out of the repository. Similarly, an "attribute to content" rule (not shown) may specify a synchronization action to be applied only in the opposite direction.

In the example above, there are two related content-to-attribute rules, for the attribute "title". It will be noted that a name has been assigned to each such rule, one being named "coreRule" and the other "metaRule". Each of these rules has a different context. The "coreRule" has an associated attribute "title", indicating that it synchronizes certain content data with a metadata field named "title". The "metaRule" has an associated attribute "auxtitle", indicating that it synchronizes certain content with a metadata field named "auxtitle".

In each case, the ContentXPath of the rule is the same, i.e., the desired content data is identified with the tag "title" within the corresponding file. However, it is expected that more than one file contained within the root content document may have a "title" tag. Without an identified context for these rules, they would be ambiguous. I.e. it would be unclear which file's tag should be synchronized with the various metadata fields.

Context is associated with these rules by the variable declarations for files "core.xml" and "metadata.xml". Each of these variable declarations has a corresponding rule associated with it, informing the synchronization engine that the context of the rule is the named file. E.g., the context of the rule "coreRule" is file "core.xml", and the metadata field "title" will be synchronized with content data from file "core.xml" according to the terms of "coreRule". Similarly, metadata field "auxtitle" will be synchronized with content data from "metadata.xml" according to the rule "metaRule".

If the context is to be optional, an additional parameter "optional" (not shown in table above) can be associated with the variable declaration which defines the context of the rule. If no "optional" parameter is present, it is assumed the context is mandatory.

Although an "attribute" as used in the above example is data in a metadata field, a content attribute could alternatively have been selective data in another document from document repository 306, with which the current document (being checked out or in) is to be synchronized.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Examples of computer-readable storage media are illustrated in FIG. 2 as system memory 202 and data storage devices 225-227.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although a specific embodiment of the invention has been disclosed along with certain alternatives, it will be recognized by those skilled in the art that additional variations in form and detail may be made within the scope of the following claims:

What is claimed is:

1. A method for maintaining a content management system (CMS), comprising the steps of:
    maintaining a document repository in said CMS, said document repository containing a plurality of content documents;
    maintaining one or more content attributes in said CMS, each content attribute being associated with a respective one or more content documents of said plurality of content documents;
    associating a respective content document context with each of at least one said content attributes;
    automatically synchronizing a first content document with each of at least one said content attributes associated with said first content document and with which a respective content document context is associated according to the associated content document context;

wherein associating a respective content document context with each of at least one said content attributes comprises generating a respective synchronization rule for each of at least one said content attributes, each said synchronization rule defining respective content document data to be synchronized with a respective content attribute and having a respective content document context, and wherein automatically synchronizing a first content document with each of at least one said content attributes comprises invoking a synchronization engine which enforces each said synchronization rule.

2. The method of claim 1, wherein:

maintaining one or more content attributes in said CMS comprises maintaining metadata with respect to said plurality of content documents, said metadata comprising a plurality of metadata records, each metadata record corresponding to a respective content document of said plurality of content documents and having a respective set of at least one metadata field, each said content attribute being maintained in a respective metadata field; and automatically synchronizing a first content document with each of at least one said content attributes comprises automatically synchronizing each of at least one said metadata field with which a respective content document context is associated within the corresponding metadata record with data from the first content document according to the associated content document context.

3. The method of claim 1, wherein associating a respective content document context with each of at least one said content attributes comprises generating a respective synchronization rule for each of a plurality of said content attributes, including a first synchronization rule for a first content attribute and a second synchronization rule for a second content attribute, each said first and second synchronization rule defining the same content document data to be synchronized with the respective content attribute and having a respective different content document context.

4. The method of claim 1, wherein generating a respective synchronization rule for each of at least one said content attributes comprises the steps of:

generating each said synchronization rule in a source file in a document markup language; and parsing the source file to generate a document object model.

5. The method of claim 1, wherein a first said synchronization rule includes an "optional" parameter, said "optional" parameter causing the corresponding content attribute to be synchronized with content data defined by the first synchronization rule within the content document context of the first synchronization rule if said content data defined by the first synchronization rule within the content document context of the first synchronization rule exists, and if not to be synchronized with content data defined by the first synchronization rule and not within the content document context of the first synchronization rule.

6. The method of claim 1, wherein said first content document is a file incorporating a plurality of contained files in nested form, and wherein each said content document context comprises a respective subset of one or more of said contained files.

7. The method of claim 6, wherein said first content document is a file in a ".docx" format.

8. A computer program product for maintaining a content management system (CMS), the computer program product comprising:

a computer readable storage medium having computer readable program code embodied therewith, the computer readable program code comprising:

computer readable program code configured to automatically synchronize content documents maintained in a document repository of said CMS, said document repository containing a plurality of content documents, with metadata with respect to said plurality of content documents maintained by said CMS, said metadata comprising a plurality of metadata records, each metadata record corresponding to a respective content document of said plurality of said plurality of content documents and having a respective set of at least one metadata field, wherein a respective content document context is associated with each of at least one said metadata field, wherein said computer readable program code is configured to automatically synchronize content documents with metadata by automatically synchronizing each of at least one said metadata field with which a respective content document context is associated within the corresponding metadata record with data from a respective content document according to the associated content document context;

wherein said computer readable program code comprises a synchronization engine which enforces each of at least one synchronization rule, each said synchronization rule defining respective content document data to be synchronized with a respective metadata field and having a respective content document context;

wherein said at least one synchronization rule comprises a respective synchronization rule for each of a plurality of said metadata fields, including a first synchronization rule for a first metadata field and a second synchronization rule for a second metadata field, each said first and second synchronization rule defining the same content document data to be synchronized with the respective metadata field and having a respective different content document context.

9. The computer program product of claim 8, wherein said at least one synchronization rule is generated by parsing a source file to create a document object model enforced by said synchronization engine, said source file being generated in a document markup language.

10. The computer program product 8, wherein a first said synchronization rule includes an "optional" parameter, said "optional" parameter causing the corresponding metadata field to be synchronized with content data defined by the first synchronization rule within the content document context of the first synchronization rule if said content data defined by the first synchronization rule within the content document context of the first synchronization rule exists, and if not to be synchronized with content data defined by the first synchronization rule and not within the content document context of the first synchronization rule.

11. The computer program product of claim 8, wherein a first content document is a file incorporating a plurality of contained files in nested form, and wherein each said content document context of said first content document comprises a respective subset of one or more of said contained files.

12. The computer program product of claim 11, wherein said first content document is a file in a ".docx" format.

13. A digital data processing system, comprising:

at least one processor;

a memory storing executable instructions for execution on said at least one processor;

a document repository for a content management system (CMS), said document repository containing a plurality of content documents each storable in said memory;

a synchronization mechanism which automatically synchronizes each of a plurality of said content documents with respective each of at least one content attribute associated with the respective content document, each content attribute being associated with a respective one or more content documents of said plurality of content documents;

metadata with respect to said plurality of content documents and storable in said memory, said metadata comprising a plurality of metadata records, each metadata record corresponding to a respective content document of said plurality of content documents and having a respective set of at least one metadata field, each said content attribute being maintained in a respective metadata field;

wherein each content attribute of a first subset of said at least one content attribute, said first subset containing at least one content attribute, is associated with a respective content document context, and wherein said synchronization mechanism automatically synchronizes each content attribute of said first subset with the respective content document according to the respective associated content document context wherein said synchronization mechanism automatically synchronizes each of at least one said metadata field with which a respective content document context is associated within the corresponding metadata record with data from the respective content document according to the associated content document context.

14. The digital data processing system of claim 13, wherein said synchronization mechanism comprises a synchronization engine which enforces each of at least one synchronization rule, each said synchronization rule for a respective content attribute and defining respective content document data to be synchronized with the respective content attribute, each of at least one said synchronization rule having a respective content document context.

15. The digital data processing system method of claim 14, wherein said synchronization mechanism comprises a respective synchronization rule for each of a plurality of said content attributes, including a first synchronization rule for a first content attribute and a second synchronization rule for a second content attribute, each said first and second synchronization rule defining the same content document data to be synchronized with the respective content attribute and having a respective different content document context.

16. The digital data processing system of claim 13, wherein a first content document of said plurality of content documents is a file incorporating a plurality of contained files in nested form, and wherein each said content document context of said first content document comprises a respective subset of one or more of said contained files.

\* \* \* \* \*